(12) United States Patent
Caulfield

(10) Patent No.: US 10,592,517 B2
(45) Date of Patent: Mar. 17, 2020

(54) RANKING ITEMS

(71) Applicant: ARM LIMITED, Cambridge (GB)

(72) Inventor: Ian Michael Caulfield, Cambridge (GB)

(73) Assignee: ARM Limited, Cambridge (GB)

( * ) Notice: Subject to any disclaimer, the term of this patent is extended or adjusted under 35 U.S.C. 154(b) by 279 days.

(21) Appl. No.: 15/678,464

(22) Filed: Aug. 16, 2017

(65) Prior Publication Data

US 2019/0057093 A1    Feb. 21, 2019

(51) Int. Cl.
*G06F 17/30* (2006.01)
*G06F 16/2457* (2019.01)
*G06F 16/22* (2019.01)

(52) U.S. Cl.
CPC .... *G06F 16/24578* (2019.01); *G06F 16/2246* (2019.01)

(58) Field of Classification Search
CPC ................................................ G06F 16/24578
USPC ................................................ 707/600–899
See application file for complete search history.

(56) References Cited

U.S. PATENT DOCUMENTS

2009/0119392 A1* 5/2009 Bonjour ............. H04L 41/0893
709/223

* cited by examiner

*Primary Examiner* — Isaac M Woo
(74) *Attorney, Agent, or Firm* — Nixon & Vanderhye P.C.

(57) ABSTRACT

An apparatus comprises a reduction tree to rank a given item of a set of M items relative to other items of the set of M items, in dependence on ranking information indicating an order of preference for the set of M items. The reduction tree has a number of levels of node circuits arranged in a tree structure, each node circuit configured to generate a plurality of node output signals indicative of whether a corresponding subset of the set of M items includes at least N more preferred items than the given item, where $N \geq 2$. A node circuit at a level of the reduction tree other than a first level is configured to combine the node output signals generated by at least two node circuits at a previous level of the reduction tree, such that the number of items in the corresponding subset increases through successive levels of the reduction tree, until the subset of items corresponding to a root node circuit at a final level of the reduction tree comprises the set of M items.

20 Claims, 11 Drawing Sheets

RANKING ITEMS

BACKGROUND

Technical Field

The present technique relates to the field of data processing. More particularly it relates to ranking of items.

Technical Background

In a data processing apparatus, there may be a number of scenarios in which it may be useful to rank items (e.g. instructions, cache entries, memory access requests) according to associated ranking information. Hence, circuitry for selecting items based on ranking information, or ordering the items by the ranking information, can be useful for a range of arbitration functions.

SUMMARY

At least some examples provide an apparatus comprising:

a reduction tree to rank a given item of a set of M items relative to other items of the set of M items, in dependence on ranking information indicative of an order of preference for the set of M items, the reduction tree comprising a plurality of levels of node circuits arranged in a tree structure, each node circuit configured to generate a set of node output signals indicating, for each value of k where $1 \leq k \leq N$ and $N \geq 2$, whether a corresponding subset of the set of M items includes at least k more preferred items than the given item;

wherein a node circuit at a level of the reduction tree other than a first level is configured to combine the set of node output signals generated by at least two node circuits at a previous level of the reduction tree, such that the number of items in the corresponding subset increases through successive levels of the reduction tree, until the subset of items corresponding to a root node circuit at a final level of the reduction tree comprises the set of M items.

At least some examples provide a method comprising:

ranking a given item of a set of M items relative to other items of the set of M items, in dependence on ranking information indicative of an order of preference for the set of M items;

the ranking comprising processing the ranking information using a reduction tree comprising a plurality of levels of node circuits arranged in a tree structure, each node circuit generating a set of node output signals indicating, for each value of k where $1 \leq k \leq N$ and $N \geq 2$, whether a corresponding subset of the set of M items includes at least k more preferred items than the given item;

wherein a node circuit at a level of the reduction tree other than a first level combines the set of node output signals generated by at least two node circuits at a previous level of the reduction tree, such that the number of items in the corresponding subset increases through successive levels of the reduction tree, until the subset of items corresponding to a root node circuit at a final level of the reduction tree comprises the set of M items.

At least some examples provide an apparatus comprising:

first and second issue ports to issue instructions for execution by at least one execution unit, wherein the second issue port is capable of issuing at least one type of instruction which is unsupported by the first issue port; and selection circuitry to select, from among a set of pending instructions, instructions to be issued using the first issue port and the second issue port;

wherein the selection circuitry is configured to perform, in dependence on ranking information indicative of an order of preference for the set of pending instructions:

a first selection operation to select two most preferred instructions from a subset of the set of pending instructions capable of being issued by both the first issue port and the second issue port; and a second selection operation to select a most preferred instruction from the set of pending instructions capable of being issued using the second issue port; and the selection circuitry is configured to select said instructions to be issued using the first issue port and the second issue port in dependence on the first selection operation and the second selection operation.

DESCRIPTION OF EXAMPLES

Figure 1:
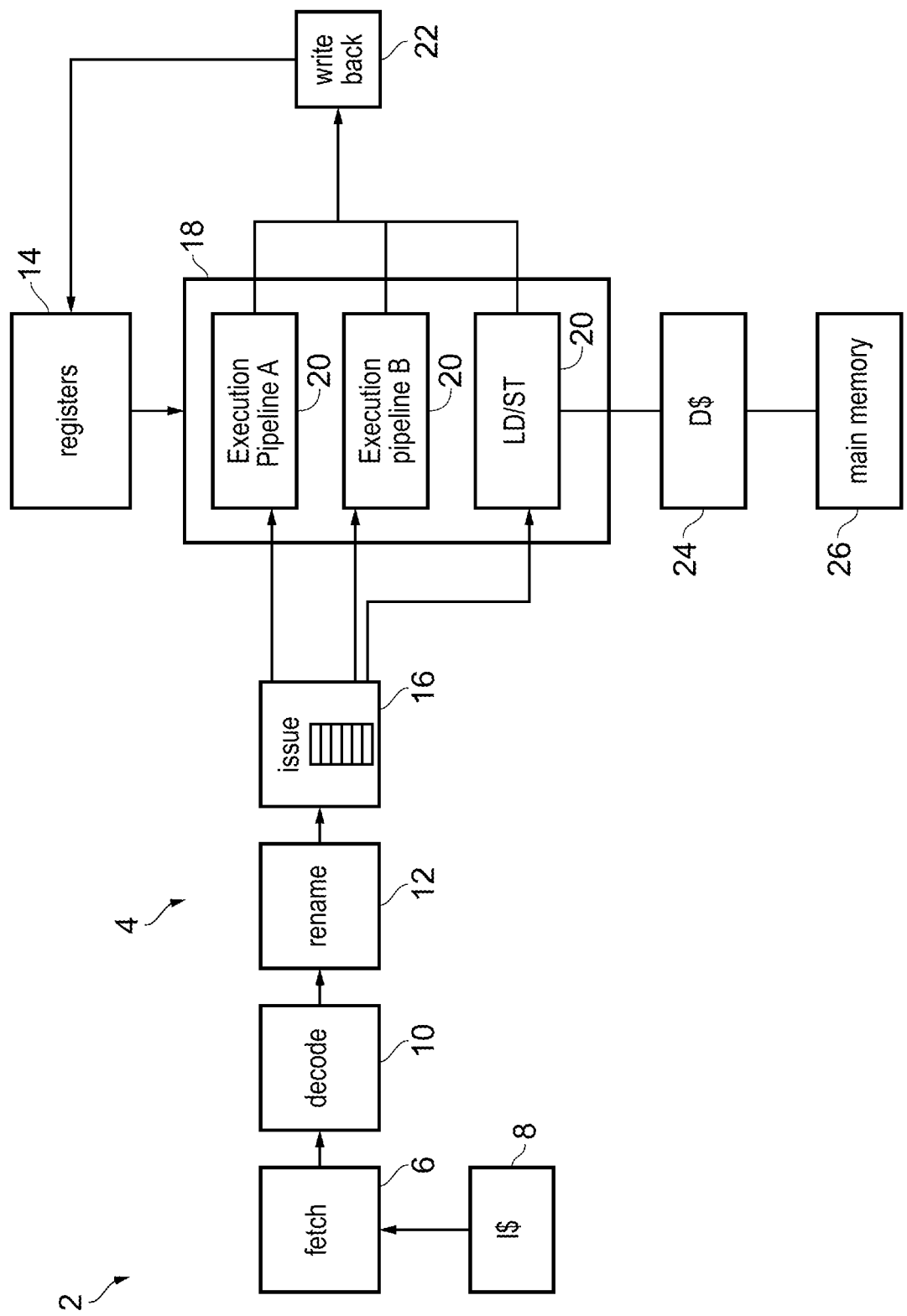
FIG. 1 schematically illustrates an example of a data processing apparatus.

The following description describes some specific examples but it will be appreciated that the invention is not limited to these precise examples.

A reduction tree is provided to rank a set of M items based on associated ranking information, which indicates an order of preference for the M items. The reduction tree has two or more levels of node circuits arranged in a tree structure, with each node circuit generating a set of node output signals indicative of whether a corresponding subset of the set of M items includes, for each value of k where $1 \leq k \leq N$ and $N \geq 2$, at least k more preferred items than the given item. A node circuit at a level of the reduction tree other than a first level combines the node output signals generated by at least two node circuits at a previous level of reduction tree, so that the number of items in the corresponding subset associated with a given node increases through successive levels of the reduction tree, until eventually the subset of items which corresponds to a root node circuit at the final level of the reduction tree comprises the entire set of M items.

This approach provides a faster technique for determining whether the given item is among the N most preferred items of the set of M items (where N is 2 or more), or for ordering the M items by their ranking information. Typical approaches for selecting or ordering items by ranking would use a sequential approach where first the most preferred item is identified, then the most preferred item is excluded from the set and then the selection step repeated to find the next most preferred item, and so on. The sequential approach can be slow as the logic depth that has to be traversed to find the $N^{th}$ highest ranking item can be significant. In contrast, with the reduction tree discussed above, each node circuit itself provides a set of node output signals which enables a determination of whether there are at least 1 more preferred items than the given item, at least 2 more preferred items than the given item, and in cases where N is greater than 2, so on for each value of k up to at least N more preferred items, so that by the time the tree reaches the root node circuit, the ranking of the given item has been compared with rankings of all of the other items in the set of M items. This increases the extent to which the identification of the ranking for at least 2 different ranking positions (e.g. $1^{st}$ and $2^{nd}$) can be performed in parallel, hence reducing the logic depth and signal propagation delay in reaching the outcome. This enables performance to be improved in many data processing scenarios which rely on selecting at least two most preferred items from a set or on ordering the entire set by their ranking.

The node output signals can represent whether there are at least 1 to N more preferred items than the given item in different ways. In one example, each node circuit may generate at least N node output signals, where $2 \leq N \leq M$ and the $i^{th}$ node output signal is indicative of whether a corresponding subset of the set of M items includes at least i more preferred items than the given item, where $1 \leq i \leq N$. In some cases there may be some redundancy so that the number of node output signals generated by a given node could be greater than N (e.g. this can simplify the logic for generating the node output signals, to allow 2-input logic gates can be used instead of 3-input gates for example).

In another example, the set of node output signals generated by a particular node circuit may comprise respective bits of a count value (represented as a binary value) which counts how many more preferred items have been detected among the subset of items corresponding to that node circuit. Hence, each node circuit could add count values received from a node circuit in a previous level of the tree, so that gradually the tree accumulates values which indicate how many more preferred items are present, and the relative ranking of the given item among the set of M items can be determined based on the output at the root node circuit. The count value indicates for each value of k (in the range 1 to N) whether there at least k more preferred items than the given item, e.g. if the count value is 2 then this would indicate both that there is at least 1 more preferred item, and that there are at least 2 more preferred items. Hence, it is not essential to explicitly provide separate indications for each value of k in the range 1 to N—the set of node output signals may simply collectively provide information which enables it to be determined, for each value of k, whether there are at least k more preferred items in the corresponding subset of items.

In some examples, selection circuitry may determine whether to select the given item as one of N most preferred items of the set of M items in dependence on the node output signals generated by said root node circuit. Hence, it is not essential to determine the exact ranking position of the given item all the way down to the least preferred item. It may be enough to know whether the given item is among the N most preferred items, which can be determined from the set of node output signals output by the root node circuit. For example this could be useful in a scenario in which N symmetric slots are available for handling the selected items and so it does not matter which particular one of the N most preferred items is allocated to each slot, as long as the most preferred items are favoured for selection. For example, the selection circuitry could output a binary indication of whether the item is in the N most preferred items, generated by a combination of the N node output signals from the root node circuit.

Alternatively, the reduction tree can be used for ordering all M items of the set by their ranking information, even if no selection of fewer than M items is being made. For example, even if none of the items are being excluded from the set, it could still be useful to know which item is the most preferred, which the next most preferred and so on, e.g. for allocating the items to appropriate item slots based on their ranking. Hence, the apparatus may comprise selection circuitry to determine whether to select the given item according to a relative ranking of the given item among the set of M items determined in dependence on the node output signals generated by said root node circuit. Hence, the node output signals of the root output signal may be combined to give a number of ranking position signals, where each ranking position signal corresponds to a given value of p ($1 \leq p \leq M$) and indicates whether the given item is the $p^{th}$ most preferred item in the set of M items. Hence, the output of the selection circuitry may indicate the relative ranking of the given item relative to the N most preferred items.

The reduction tree may identify whether a given item is one of the N most preferentially ranked items. The selection circuitry for selecting the N most preferentially ranked items or for ordering the M items by their ranking information may comprise two or more of such reduction trees, with each reduction tree configured as discussed above, but with the given item corresponding to a different item of the set of M items for each of the respective reduction trees. For example, a first reduction tree may rank Item 0 relative to the other items, a second reduction tree may rank Item 1 relative to the other items, and so on. The output of a given reduction tree may be passed to a multiplexer or other selection logic for controlling whether the corresponding given item is selected for an operation or function to be performed by the data processing apparatus.

The ranking information may comprise a ranking matrix comprising a number of ranking values each corresponding to a given pair of items and indicating which of the corresponding pair of items is the most or least preferred. This form of a ranking matrix can be particularly useful for representing rankings by age as each time a new item is encountered it can be relatively simple to reset each of the ranking values corresponding to that new item to some default value indicating that each other item is older than the new item. Nevertheless it can be used for ranking by other parameters as well. As the ranking matrix does not explicitly indicate the relative ranking position of a given item, if the relative ranking needs to be determined or a certain number of most preferentially ranked items need to be selected, some logic is needed to combine the ranking values to identify the most preferentially ranked items. The reduction tree discussed above enables this operation to be performed with reduced logic depth compared to alternatives.

Hence, a node circuit at the first level of the reduction tree may receive the ranking values for each item of the subset of items other than the given item. For example, the ranking values input to the reduction tree for selecting a given item could correspond to a row or a column of the ranking matrix corresponding to that given item. Whether a ranking value of 1 or 0 indicates a higher or lower ranking is an implementation choice and could be implemented either way round.

Each item may also be associated with a valid signal indicating whether the corresponding item is valid. In this case, the selection circuitry may select the N most preferred valid items from the set of M items (so that an invalid item cannot be selected as one of the N most preferred items regardless of its ranking as expressed by the ranking information). For example, the reduction tree may have a number of inputs which each receive a valid signal for a corresponding item, which gates whether that item can be asserted as one of the most preferred items.

Although the technique can be used with N having any value greater than or equal to 2, in practice it is often enough to select relatively few most preferred items from a set of items, since as N approaches M the performance gains from selecting the N most preferred items from the set become lower compared to simply selecting randomly, and so the added cost of generating a greater number of node output signals at each node of the reduction tree may not be justified. Examples with N=2 or N=3 may be particularly useful as often there is a need to select relatively few items from a larger set of M items.

In one example, each level of the reduction tree other than the first may have node circuits corresponding to a subset of the set of M items which comprises double the number of items compared to the subset of items associated with a node circuit at the previous level of the reduction tree. Hence, each node circuit may combine the node output signals of two node circuits at the previous level of the reduction tree.

In general, the ranking information may rank the set of M items according to values of a given parameter. The parameter could, for example, be the age of the items or the priority of items, or any other value associated with the items. The apparatus may have ranking update circuitry to update the ranking information as new items are received, to maintain the ranking information appropriate for the current set of items. The order of preference associated with the selection based on the ranking information could be in ascending or descending order of the ranking, so that the most preferred items could be either the highest ranked items or the lowest ranked items. For example, for some applications it may be desired to identify the N oldest items, while for other applications of the technique the N youngest items could be identified. Similarly, the selection may be of the N highest priority items or the N lowest priority items (e.g. for an eviction operation the lowest priority items may be selected). Hence, the term "most preferred" or "most preferentially ranked" does not imply that these items must be the items with the highest values of the parameter by which the items are ranked, and the technique encompasses selecting the items in reverse order of some given ranking parameter.

Also, sometimes some of the set of M items could have equal values of the given parameter (e.g. equal priority). In this case, the ranking information for those equal items could be set arbitrarily to indicate one of those items as higher ranked (e.g. the ranking bit may be set to either 0 or 1 as desired), as it would not matter which item is preferentially selected. Hence, although the ranking information may express a comparative ranking for a pair of items, this does not necessarily imply that those items definitely have different values for the parameter by which the items are being ranked.

The items which are ranked could correspond to a wide variety of items within a data processing system. In one example, a memory controller may select from among a set of memory transactions awaiting processing by memory system. There may be more than one memory transaction which can be handed in parallel, and so in each cycle the memory controller may select the N most preferentially ranked items from among the pool of outstanding memory transactions, where the ranking could be by age or by priority for example. Also, even if there is sufficient memory bandwidth for handling the entire set of M items, it may be more efficient to allocate the most preferentially ranked item to one memory port and the next most preferentially ranked item to a different memory port, for example. In these scenarios, the reduction tree discussed above can reduce the logic depth associated with evaluating the relative ranking of the memory transactions, to enable faster selection/arbitration.

In another example, a cache (e.g. a data cache, instruction cache, or address translation cache such as a TLB (translation lookaside buffer) or page walk cache) may have a victim selection policy which selects, as valid entries for which the data is to be evicted to make room for new data, two or more of the least recently used entries. In this case, the ranking could be based on history information tracking the order of usage of the cache entries, and a reduction tree of the form discussed above can be used to improve performance in identifying the N least recently used entries of the cache.

In another example, a processing pipeline may have issue circuitry for controlling issue of instructions for execution by one or more execution units. Hence the items may be instructions awaiting issue. Typically within an out-of-order processor, one of the critical timing paths may be around the selection of which available instructions should execute, which is often done based on the age of the instructions (favouring older instructions for selection ahead of younger instructions). By using the reduction tree discussed above, the logic depth and hence performance associated with the selection of instructions for issue can be improved.

The issue circuitry may have at least two issue ports for issuing instructions for execution by at least one execution unit. Some issue ports may have multiple execution units associated with them. The issue circuitry may select which instructions are to be issued using a given issue port based on the ranking of the instructions by the selection logic including the reduction tree discussed above.

The term "instruction" used herein encompasses micro-operations which are independently schedulable operations as seen by the execution units of a processing pipeline. In some pipelines, some program instructions fetched from memory may be decomposed into multiple micro-operations (e.g. by the decode stage of the pipeline), and each of the micro-operations could then be separately issued for execution. This could be useful if a single program instruction as defined in the architecture requires multiple operations to be performed on different execution units. For example, some variants of a load/store instruction could not only trigger a load/store micro-operation sent to a load/store execution unit, but could also trigger an ALU micro-operation to update an address in a base register. Also, a load/store multiple instruction could trigger multiple load/store micro-operations each for loading a value to a respective register from memory or storing a value from a respective register to memory. Other instructions may simply be passed down the pipeline as a single micro-operation. Hence, it is not essential for the "instructions" issued for execution to still be in the same form as the corresponding program instructions which triggered issuing of those instructions.

In some systems, the capabilities of the issue ports may be asymmetric so that while a first issue port and a second issue port may be provided for issuing instructions, the second issue port may be capable of issuing at least one type of instruction which is unsupported by the first issue port. For example, while both issue ports may be capable of issuing a first type of instruction, the second issue port may be issuing instructions to an execution unit which can also process a second type of instruction that is not supported by any execution unit coupled to the first issue port. In cases where the issue ports have asymmetric capabilities, it may be more complex to select which instruction should be issued by each issue port. This is because the N most preferentially ranked instructions may not necessarily be the most efficient to issue (e.g. when selection by age, if the N oldest instructions could be handled by either issue port, followed by a number of next oldest instructions which can only be handled with the second issue port, performance as a whole could be greater if one of the next oldest instructions requiring the second issue port was issued ahead of the older instructions which could be issued on the first issue port).

When asymmetric issue ports are provided, the issue circuitry may select the N most preferentially ranked instructions from a set of M instructions capable of being issued by both the first issue port and the second issue port where the M instructions are a subset of a set of P instructions capable of issue by the second issue port. The selection of the N most preferentially ranked instructions could be based on the reduction tree of the form discussed above, although it could also be done by other techniques. An additional selection may also be made of the most preferentially ranked instruction capable of issue by the second issue port only. The issue circuitry may also determine, for each instruction, whether there is a more preferentially ranked instruction capable of being issued on the second issue port only.

Based on these selections, the issue circuitry may then select which instructions are issued via each issue port based on whether the most preferentially ranked instruction of the P instructions is capable of being issued by the first issue port:

When the most preferentially ranked instruction of the set of P instructions is incapable of being issued by the first issue port, the most preferentially ranked instruction of the set of P instructions may be issued using the second issue port, and the most preferentially ranked ranking instruction of the set of M instructions (which can be handled using either the first or second issue port) is issued using the first issue port.

When the most preferentially ranked instruction of the set of P instructions is capable of being issued by the first issue port, the most preferentially ranked instruction of the set of M instructions (which is also the most preferentially ranked instruction of the set of P instructions) can be issued to the first issue port and the second most preferentially ranked instruction of the set of M instructions can be issued using the second issue port.

This approach reduces the likelihood that the more capable second issue port is used for an instruction that could have issued by the first issue port, to save the second issue port for instructions which can only issue via the port, hence improving instruction throughput.

Hence, the issue stage may make a number of determinations including:

a first selection of the N most preferred instructions from the set of M instructions capable of being issued by both issue ports, selection of the most preferred instruction, and for each instruction, a determination of whether there are any more preferred instructions which can only be issued on the second issue port.

These signals can then be combined to control the issue port allocations discussed above. This approach enables the selection of which instructions to issue using the two issue ports to be determined in parallel in a more efficient manner.

In one example with asymmetric first and second issue ports as discussed above, the selection circuitry may perform a first selection operation to select two most preferred instructions from a subset of the set of pending instructions capable of being issued by both the first issue port and the second issue port, and a second selection operation to select a most preferred instruction from the set of pending instructions capable of being issued using the second issue port, and may select the instructions to be issued using the first issue port and the second issue port in dependence on the first selection operation and the second selection operation. The first selection operation could be performed using a reduction tree as discussed above, or using a different technique. By considering both the first and second selection operations mentioned above when selecting instructions for issue using the first and second issue ports, the utilisation of the first and second issue ports can be improved.

FIG. 1 schematically illustrates an example of a data processing apparatus 2 having a processing pipeline 4 for processing instructions. The pipeline 4 in this example includes a fetch stage 6 for fetching instructions from an instruction cache 8, a decode stage 10 for decoding the fetched instructions and generating control signals for controlling subsequent stages to perform a corresponding processing operation, a renaming stage 12 for performing register renaming to map architectural register specifiers identified by the instructions to physical register specifiers identifying physical registers 14 provided in hardware, an issue stage 16 for queuing instructions awaiting their operands to become available and issuing instructions for execution once the instructions are available, and an execute stage 18 comprising a number of execution units 20 for executing instructions to perform corresponding data processing operations. For example the execution units 20 may include a number of execution pipelines for handling respective types of instructions such as arithmetic or logical instructions, load/store instructions, etc. A load/store pipeline in the execute stage 18 controls accesses to a data cache 24 and main memory 26. Results of the executed instructions are written back to the registers by a write back stage (or commit stage) 22. In this example the pipeline is an out-of-order pipeline, in which the issue circuitry 16 is capable of issuing instructions for execution in a different order to the program order in which they are stored in memory. However, the technique could also be applied to an in-order pipeline. For an in-order pipeline, the rename stage 12, for example, could be omitted. Hence, different embodiments may have different configurations of pipeline stages. It will be appreciated that FIG. 1 is a simplified diagram, and the data processing apparatus may include other elements, such as a branch predictor, TLB etc.

Figure 2:
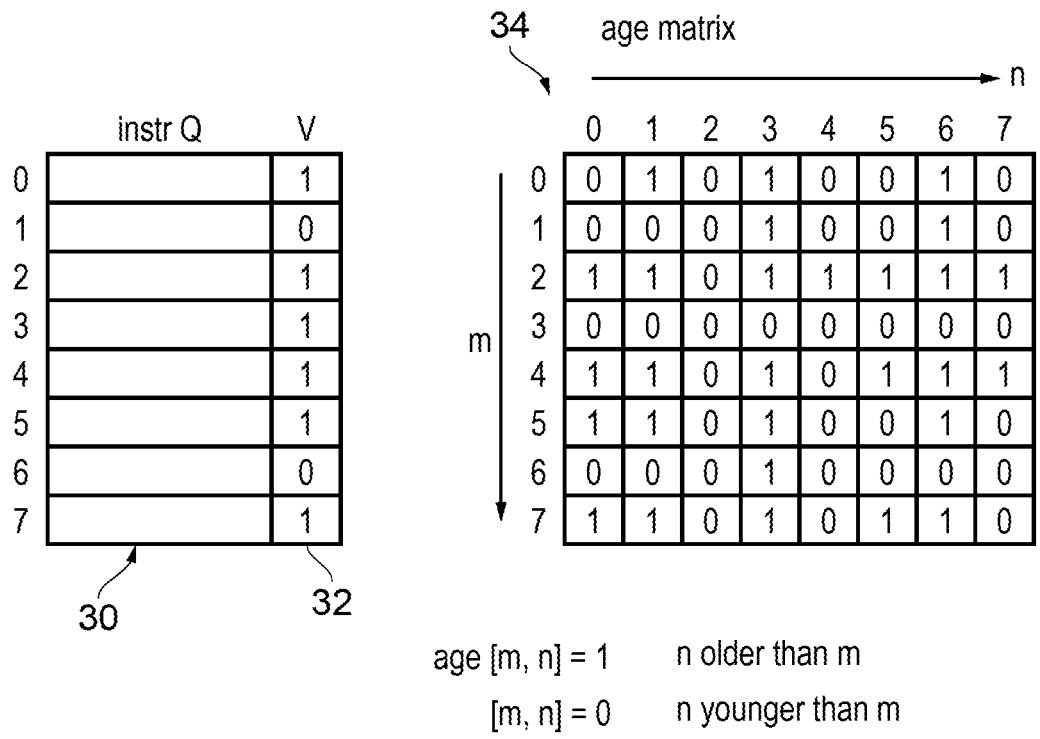
FIG. 2 shows an example of a set of items (in this case, instructions) available for selection and an age matrix providing ranking information for ranking the instructions.

FIG. 2 shows an example of the issue queue 30 within the issue stage 16 for queueing instructions which await execution. Each queued instruction is associated with a valid bit 32 specifying whether the instruction is ready for issue. The issue circuitry 16 selects the oldest valid instructions in preference to newer valid instructions, in order to maintain forward progress. The instructions are ranked by age using an age matrix 34 which provides a series of bits each indicating, for a given pair of instructions, which of the instructions is older. In this example a given age ranking value age[m, n] is equal to 1 if instruction n is older than instruction m and equal to 0 if instruction n is younger than instruction m, although in other examples the meanings of 1 or 0 could be the other way round.

Figure 3:
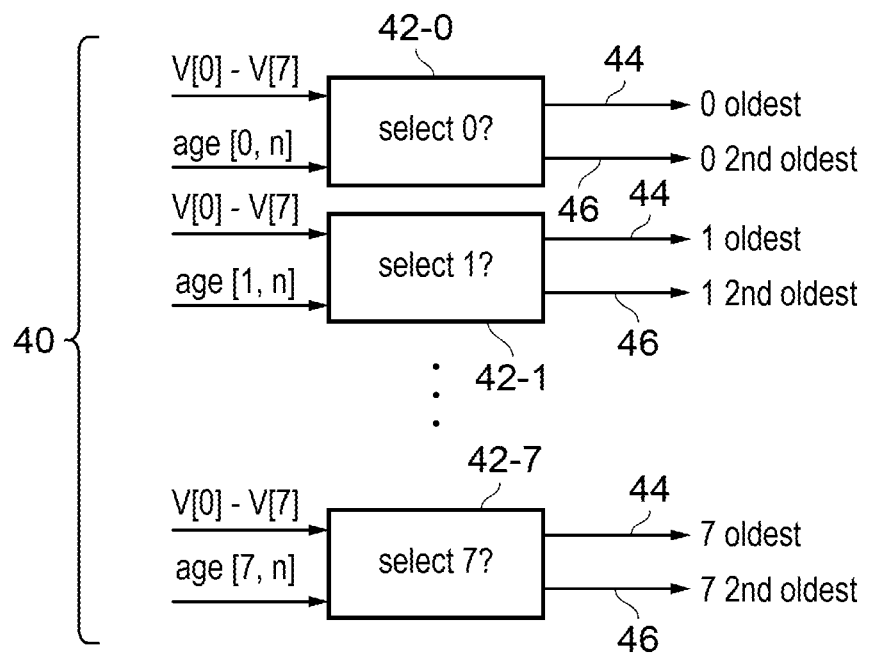
FIG. 3 shows an example of selection circuitry for selecting the N most preferred items from the set of items.

As shown in FIG. 3, the issue circuitry may include selection circuitry 40 for selecting the oldest N instructions from among a set of M instructions queued in the issue queue 30. In this example, N=2 and M=8, and the selection circuitry 40 includes a number of selection units 42-0 to 42-7 which each correspond to a given instruction of the set of instructions pending in the issue queue. Each selection unit 42 determines whether the given instruction is either the oldest or the second oldest instruction among the valid instructions in the queue. Hence, a first selecting unit 42-0 selects whether instruction 0 is the oldest or second oldest valid instruction (with signals 44, 46 being set to 1 if the instruction is the oldest or second oldest valid instruction respectively), a second selecting unit 42-1 selects whether instruction 1 is the oldest or second oldest instruction that is valid (again outputting signals 44, 46 for instruction 1 similar to the signals generated for instruction 0), and so on for each other instruction. The oldest/second oldest instruction indications 44, 46 output for each instruction can then be provided to arbitration logic for selecting which instructions to issue by a given issue port.

In an out-of-order processor core, often one of the critical timing paths is around the selection of available instructions to execute. The processor will have a pool of instructions (an "issue window") which have been decoded but not yet issued. On any given cycle, any subset of these instructions could be available for issue (due to their input operands being ready). The processor then needs to pick which of these instructions to issue on that cycle. Typically processors attempt to issue the oldest of the ready instructions, however the algorithm to select oldest instructions does not scale well as the issue width (i.e. number of instructions which can be issued in a given cycle) is increased. Larger processors generally address this by pre-allocating instructions to specific issue ports at dispatch time, and then the issue decision for each issue port only needs to independently pick the single oldest instruction (there are other benefits to preallocating the issue ports, as this allows split issue queues for separate resources). This approach scales well but has the potential for inefficiencies when only a few instructions are available for issue, but they have all been allocated the same issue port. On a large machine the size of the instruction window amortizes this cost (and timing typically precludes any other approach), but on a machine with a smaller issue window this cost could be higher.

Figure 4:
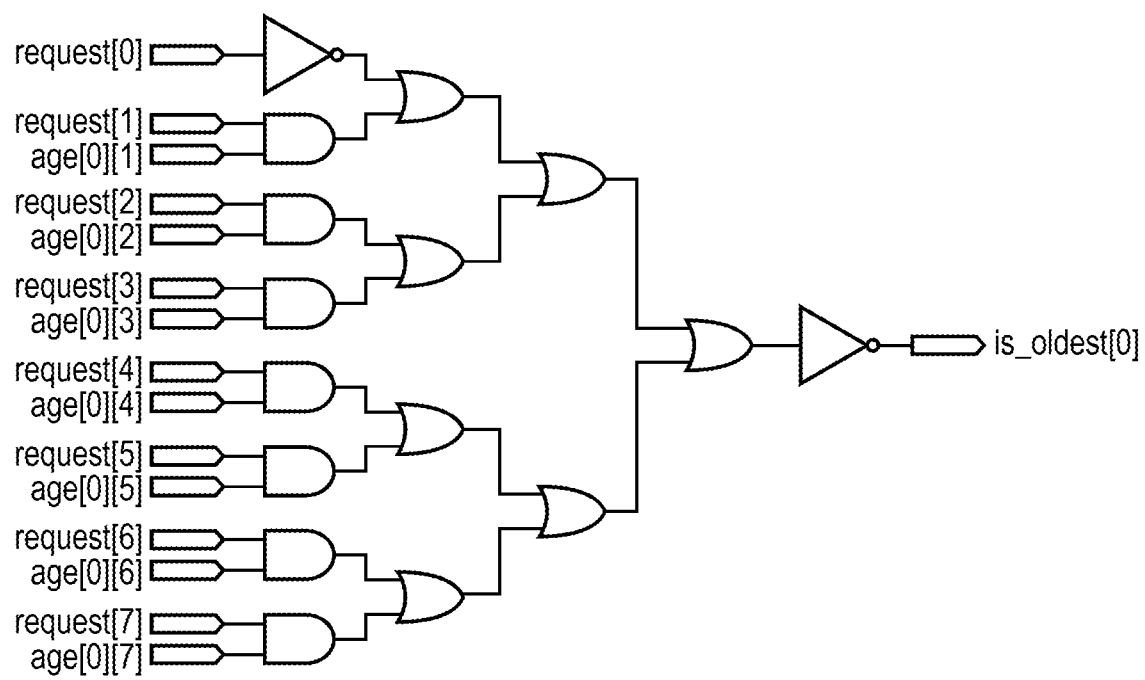
FIG. 4 is a comparative example showing circuitry for selecting the single most preferred item.

The typical method for selecting the oldest instruction from a structure such as an issue queue if the queue is noncompacting (i.e. the age order of instructions is not implied by their location in the structure) uses an age matrix, which indicates the relative ordering between each pair of instructions in the queue. For each entry (item) in the queue, each other entry is evaluated to see if it is both older and making a request—if so, the entry being evaluated is not the oldest and so is not selected. This is illustrated in FIG. 4—here there are eight entries, and the signal request[7:0] (valid signal) indicates which of these are requesting arbitration. The matrix age[7:0][7:0] is arranged such that age [m][n] is set to 1 when entry n is older than entry m. The figure shows only the logic for determining if entry 0 is the oldest—similar logic is used for each other entry. The request[0] bit is factored in to mask out entries not requesting arbitration from being picked as the oldest. This example has a logic depth of 4 2-input gates, or 4.5 if counting the final inverter as half a 2-input gate (synthesis may well be able to elide the final inversion though). In general, for n requesters, this type of circuit will have a delay of $\lceil \log_2 n \rceil + 1.5$ 2-input gates. To extend to arbitration of the second-oldest requester, two of these circuits are generally cascaded—the oldest request is selected, then this is excluded from the set of requesters and the oldest remaining request is then picked. This gives a circuit delay of $2\lceil \log_2 n \rceil + 3.5$ 2-input gates. Using three-input gates (with an assumed delay of 1.5 2-input gates) gives a slightly lower delay of $3\lceil 0.63 \log_2 n \rceil + 3$ 2-input gates.

Figure 5:
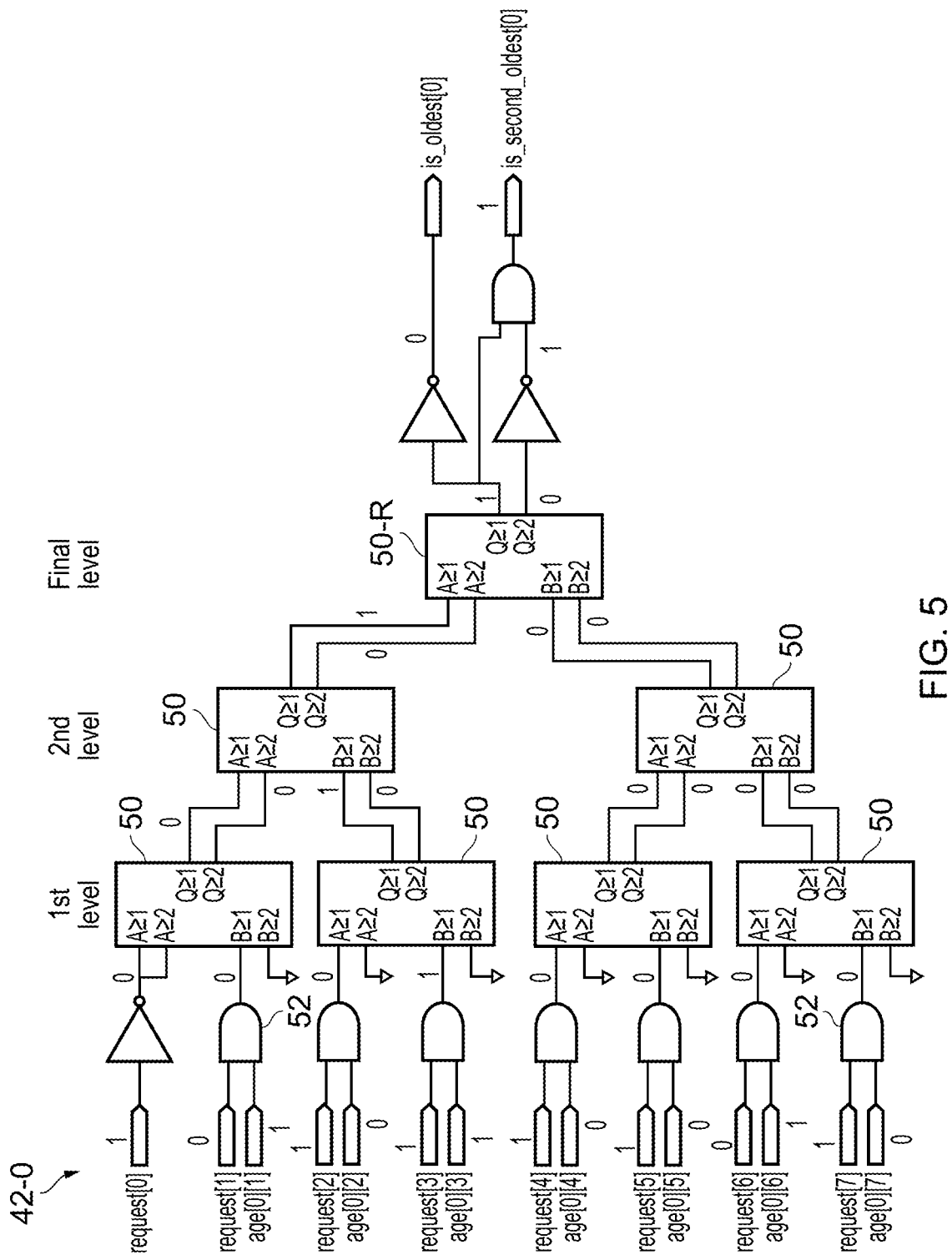
FIG. 5 shows an example of a reduction tree for identifying whether a given item is one of the N most preferred items, where N=2 in this example.
Figure 6:
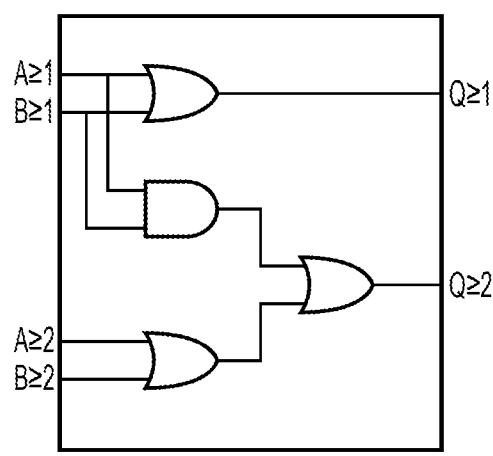
FIG. 6 shows an example of a node circuit of the reduction tree of FIG. 5.

To reduce the delay of arbitrating the oldest two requests, a radix-2 reduction tree is provided as shown FIG. 5, composed of cells (node circuits) which may for example be constructed as shown in FIG. 6 (other examples are also possible). Each reduction produces two signals—"Q≥1" and "Q≥2". The "Q≥1" signal indicates that there is at least one older requester out of the tree under this node, and "Q≥2" indicates that there are at least two older requesters, given the corresponding information for the two subtrees being reduced at this point. The cells compose as shown in FIG. 5, where in this example there are eight requesters and the circuit determines if requester 0 should be selected. At the first level of reduction the qualified requesters are provided into each of the "≥1" inputs and the "≥2" inputs are tied low. The request signal for requester 0 is tied into both the inputs for the 0 position in the tree, to ensure 0 is never selected if it is not requesting. The constant propagation for the tied-off inputs simplifies the first stage of the logic, reducing it to a single level of logic. Using only 2-input gates, the overall delay of this circuit is $2\lceil \log_2 n \rceil + 1.5$ gates, which is two levels of logic less than the existing solution described above. A greater benefit is seen when using 3-input gates, as the two OR gates on the "Q≥2" path can be merged, giving an overall delay of $1.5\lceil \log_2 n \rceil + 3$ gates.

The following table illustrates the delays for various sizes of arbitration logic, all assuming an inverter has a delay of 0.5, a 2-input gate has a delay of 1 and a 3-input gate has a delay of 1.5. The numbers in brackets indicate values where a mix of 2-input and 3-input gates would give a better result than the value indicated by the formula.

|  | Current solution | | New solution | |
| --- | --- | --- | --- | --- |
| Number of requesters | 2-input gates | 3-input gates | 2-input gates | 3-input gates |
| 8 | 9.5 | 9 | 7.5 | 7.5 |
| 16 | 11.5 | 12 (11.5) | 9.5 | 9.5 |
| 32 | 13.5 | 15 (13) | 11.5 | 10.5 |
| 64 | 15.5 | 15 | 13.5 | 12 |
| n | $2\lceil \log_2 n \rceil + 3.5$ | $3\lceil 0.63 \log_2 n \rceil + 3$ | $2\lceil \log_2 n \rceil + 1.5$ | $1.5\lceil \log_2 n \rceil + 3$ |

Hence, the reduction tree of FIG. 5 includes a number of node circuits 50, which each generate a set of N node output signals Q≥1, Q≥2 (N=2 for this example), where an $i^{th}$ node output signal (Q≥i, where i=1 . . . N) indicates whether a corresponding subset of items includes more than i higher ranking items than the given item considered in this reduction tree. For example, in FIG. 5 the given item is request 0 and each of the "Q≥1" signals indicates whether there is at least one older request in the subset of items handled under the particular node generating the output. Similarly, each of the Q≥2 indicates whether there are at least two higher ranking valid items in the corresponding subset.

An example circuit for each node circuit is shown in FIG. 6, which generates the $1^{st}$ node output signal Q≥1=A≥1 OR B≥1, and the $2^{nd}$ node output signal Q≥2=(A≥1 AND B≥1) OR A≥2 OR B≥2. Hence, if either the A≥1 or B≥1 input is set, the Q≥1 signal is also asserted, reflecting that once there is at least one one older valid item under a node in the reduction tree, all subsequent nodes on the path leading to the root node 50-R should also indicate that there is at least one older valid item. Also, the Q≥2 signal is asserted if either of the A≥2 and B≥2 inputs is asserted or if both the A≥1 and B≥1 inputs are asserted, so that once two higher ranking items are identified somewhere within the subset of items covered by the relevant node, the Q≥2 will continue to be asserted all the way up the tree to the root node circuit at the final level of the tree. In the first level of the tree the A≥1 and B≥1 are coupled to the result of ANDing the valid bit of one of the other items in the pool of M items available for selection, together with the age ranking bit which ranks that other item relative to the given item, while the A≥2 and B≥2 inputs are tied to logic 0. In subsequent levels, the A≥1, A≥2 inputs receive the Q≥1, Q≥2 outputs from a node circuit in the previous level tree, and the B≥1, B≥2 receive the Q≥1, Q≥2 outputs from a different node circuit in the previous level, so that the node effectively doubles the number of items in the subset of items considered at that node. For example in FIG. 5, at the first level of the tree each node circuit 50 corresponds to two instructions, at the second level each node 50 corresponds to 4 instructions, and at the final level the root node circuit 50-R corresponds to the entire set of 8 instructions, and outputs signals which can then be used to determine whether the given request 0 is the oldest or second oldest. Inverting the Q≥1 output of the root node circuit 50-R gives a signal "is_oldest[0]" indicating whether item 0 is the highest ranked item, and ANDing Q≥1 with NOT(Q≥2) gives a signal "is_second_oldest[0]" indicating whether item 0 is the second highest ranked item.

FIG. 5 shows a worked example using the particular values for the valid bits and age matrix shown in the example of FIG. 2, i.e. with request[0] to request [7]=V[0] to V[7] of FIG. 2, and age[0][1] to age[0][7]=1, 0, 1, 0, 0, 1, 0. As can be seen from the top row of the age matrix in FIG. 2, in this example instruction 0 is the fourth oldest instruction since, there are 3 bits set to 1 within row 0 of the age matrix, however as instructions 1 and 6 are invalid then in fact instruction 0 is actually the second oldest valid instruction. By applying the valid bits at the "request" inputs and the corresponding bits of the age matrix at the "age" inputs shown on the left hand side of FIG. 5, and rippling through the AND and OR gates as shown in FIGS. 5 and 6, the result is that instruction 0 is indeed identified as the second oldest instruction (is_oldest[0]=0 and is_second_oldest[0]=1).

It will be appreciated that FIG. 5 shows the reduction tree used in the first selecting unit 42-0 in FIG. 3, but that corresponding trees may be constructed for each of the other selecting units 42, with each tree having a different one of the instructions selected as the given instruction. For example, in the reduction tree in selection unit 42-1, the request [0] input of FIG. 5 can be replaced with an AND gate 52 combining request[0] with age[1][0], the request[1]/age [0][1] input replaced with request[1], and the age values age[0][2] to age[0][7] replaced with age[1][2] to age[1][7] respectively. Similar trees can be constructed for each other instruction as the given instruction.

In summary, by successively building up N node signals in the reduction tree indicating whether there are more than 1 . . . N higher ranking items encountered under that node, and combining the outputs of different nodes so as to gradually increase the size of the subsets of items handled under a given node, this allows the indication of oldest, second oldest or N oldest items to be generated more efficiently than using the techniques shown in FIG. 4 where one next oldest item is identified at a time and then excluded from the next selection of the next oldest item.

Figure 7:
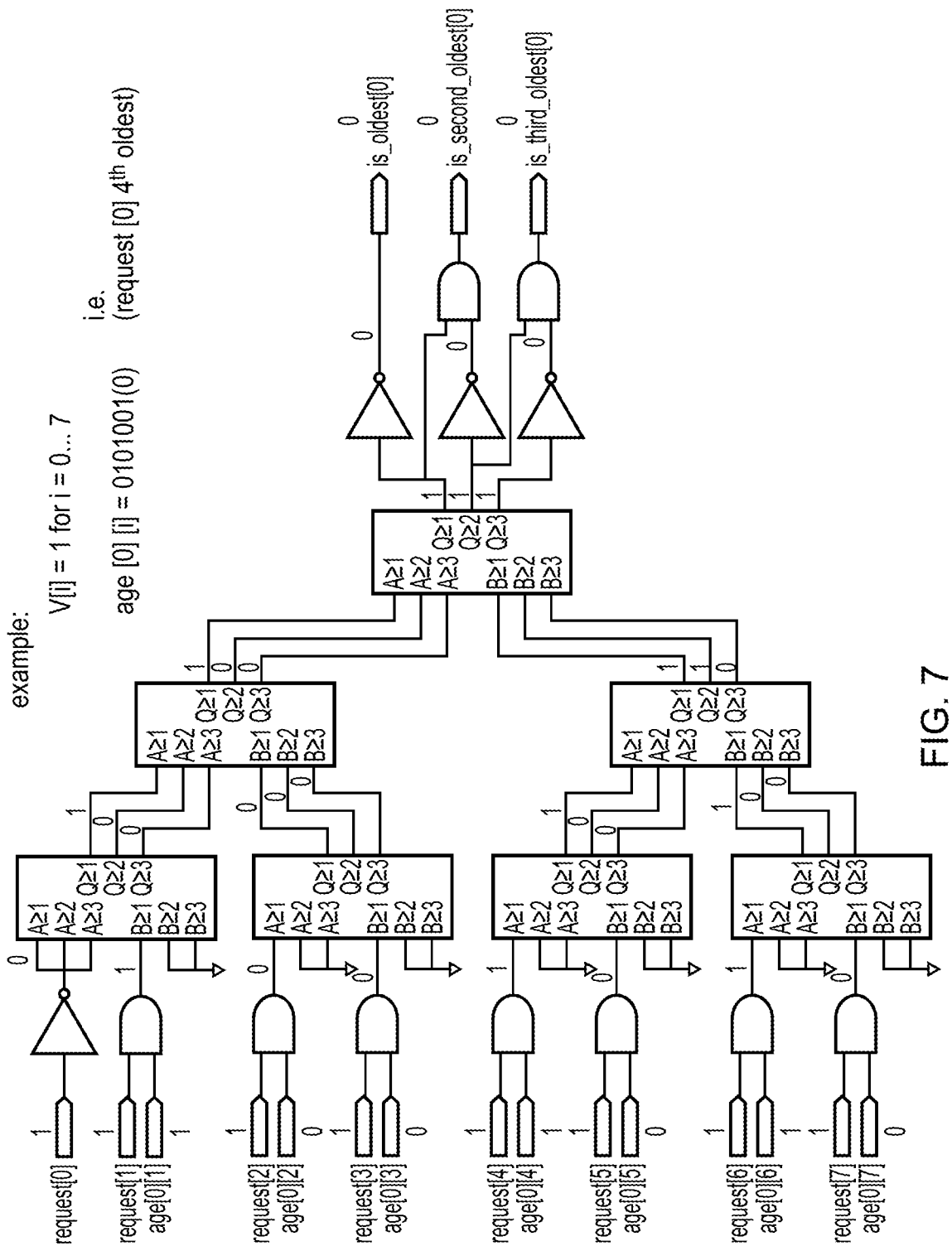
FIG. 7 shows a second example of a reduction tree for selecting the N highest ranking items, where N=3.
Figure 8:
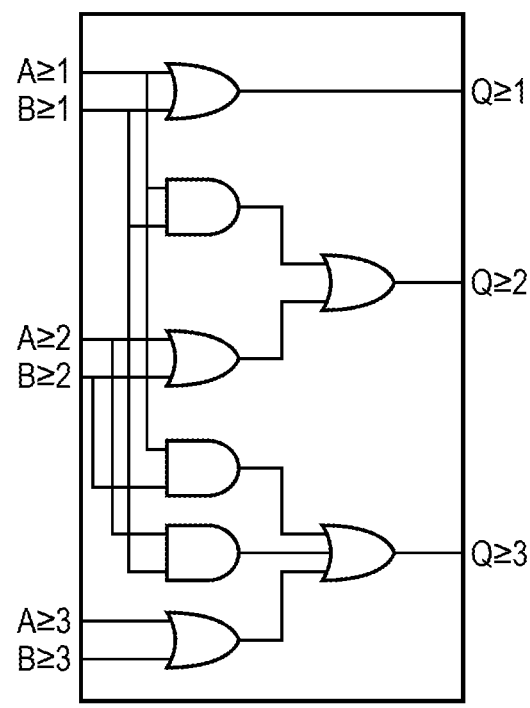
FIGS. 8 and 9 show two alternative designs for the node circuits in the reduction tree of FIG. 7.
Figure 9:
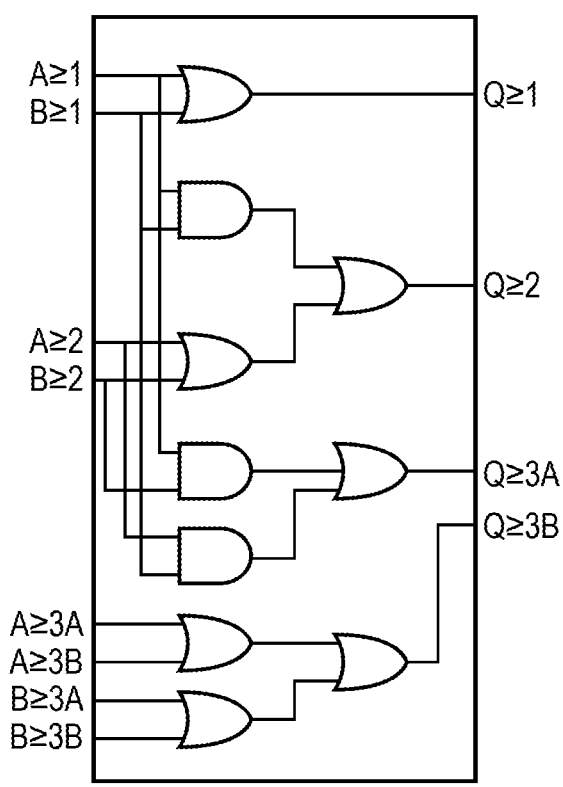

This scheme can also be extended to arbitrate the oldest three requests (N=3) using a similar structure—FIG. 8 shows an example of the basic reduction cell for this case. This cell requires the use of a 3-input OR gate, increasing the logic depth for each stage, but this can be avoided by representing the "Q≥3" output by a pair of wires as shown in FIG. 9. FIG. 7 shows how these cells are combined into an overall structure (if the node circuit of FIG. 9 is used, the "≥3" inputs/outputs are replaced with two separate inputs/outputs "≥3A" and "≥3B"). Similar to the N=2 case, constant propagation simplifies the logic in the first two stages of reduction. The overall delay for this circuit is $2\lceil \log_2 n \rceil + 2.5$ gates, compared to $3\lceil \log_2 n \rceil + 5.5$ for the cascaded single-pick solution. Detailed timings are shown in the following table:

| # of requesters | Current solution | New solution |
| --- | --- | --- |
| 8 | 14.5 | 8.5 |
| 16 | 17.5 | 10.5 |
| 32 | 20.5 | 12.5 |
| 64 | 23.5 | 14.5 |
| n | $3\lceil \log_2 n \rceil + 5.5$ | $2\lceil \log_2 n \rceil + 2.5$ |

The examples discussed above are described in relation to arbitrating between instructions awaiting issue, but it will be appreciated that a similar reduction tree could be used for any selection of N items from among a separate M items ranked by ranking information where N is greater than 2 or equal to 2. For example, a similar selection tree could be provided within a memory controller using the main memory system 26 for arbitrating between memory transactions, or within the data cache 24 for selecting among cache entries for eviction. Similarly, the rename stage 12 could use a similar selection tree to select two or more registers of the register bank 40 which are to be made available for renaming. The ranking could be based on age information or on priority or on any other kind of parameter which can be used to rank items.

Also, while the examples above show cases where N items are selected from a set of M items where N<M, a similar reduction tree could also be used for cases where all the items are "selected", but the "is_oldest", "is_second_oldest" signals, etc. are used simply to determine the position of a given item in the ranking, based on the ranking matrix of bits indicating relative rankings between pairs of items. Determining the exact ranking position among the M items can be done with a reduction tree implemented with N=M−1 (so that each circuit node generates M−1 node output signals, Q≥1, Q≥2, . . . , Q≥M−1, each indicating whether there are at least the corresponding number of higher ranking items among the set of M items. A final stage similar to the one shown in FIGS. 5 and 7 can then combine the Q≥1, Q≥2, . . . , Q≥M−1 signals to generate M ranking position signals indicating whether the given item is the $1^{st}$, $2^{nd}$ ... $M^{th}$ highest ranked item, based on the M−1 node output signals (with the ranking position signals being onehot encoded so that only one of the M ranking position signals can be asserted to indicate the unique ranking position of a given item in the set of M items, in contrast to the node output signals where when Q≥x is asserted, then Q≥1 to Q≥x−1 would also be asserted).

Figure 10:
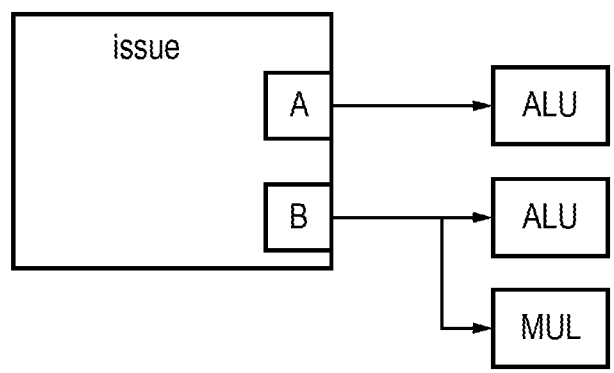
FIG. 10 shows an example of an issue stage with issue ports having asymmetric capabilities, such that a second port is capable of issuing at least one type of instruction which is not supported by a first issue port.

The discussion so far has assumed that the arbitration is for access to symmetric resources—such that any instruction could be issued to either issue port. It is common in out-of-order cores to have asymmetric resources. For example, while there may be two identical ALU pipelines, there might only be a single multiplier. Rather than having three separate issue ports to send instructions to these pipelines, it can be desirable to be able to "stack" pipelines onto fewer (in this case two) issue ports. Consider a scenario as shown in FIG. 10 where there are two issue ports, labelled A and B. Port A can accept only ALU instructions, while port B can accept either ALU instructions or multiply instructions. A scheme is presented here to issue across these two issue ports more efficiently. This is based on the observation that either the oldest instruction can issue to either issue port, in which case it can be issued to port A and the second oldest can be issued to port B, or the oldest instruction can issue only to port B, in which case this should be issued to port B and the oldest instruction which can issue to port A should be issued to port A.

Figure 11:
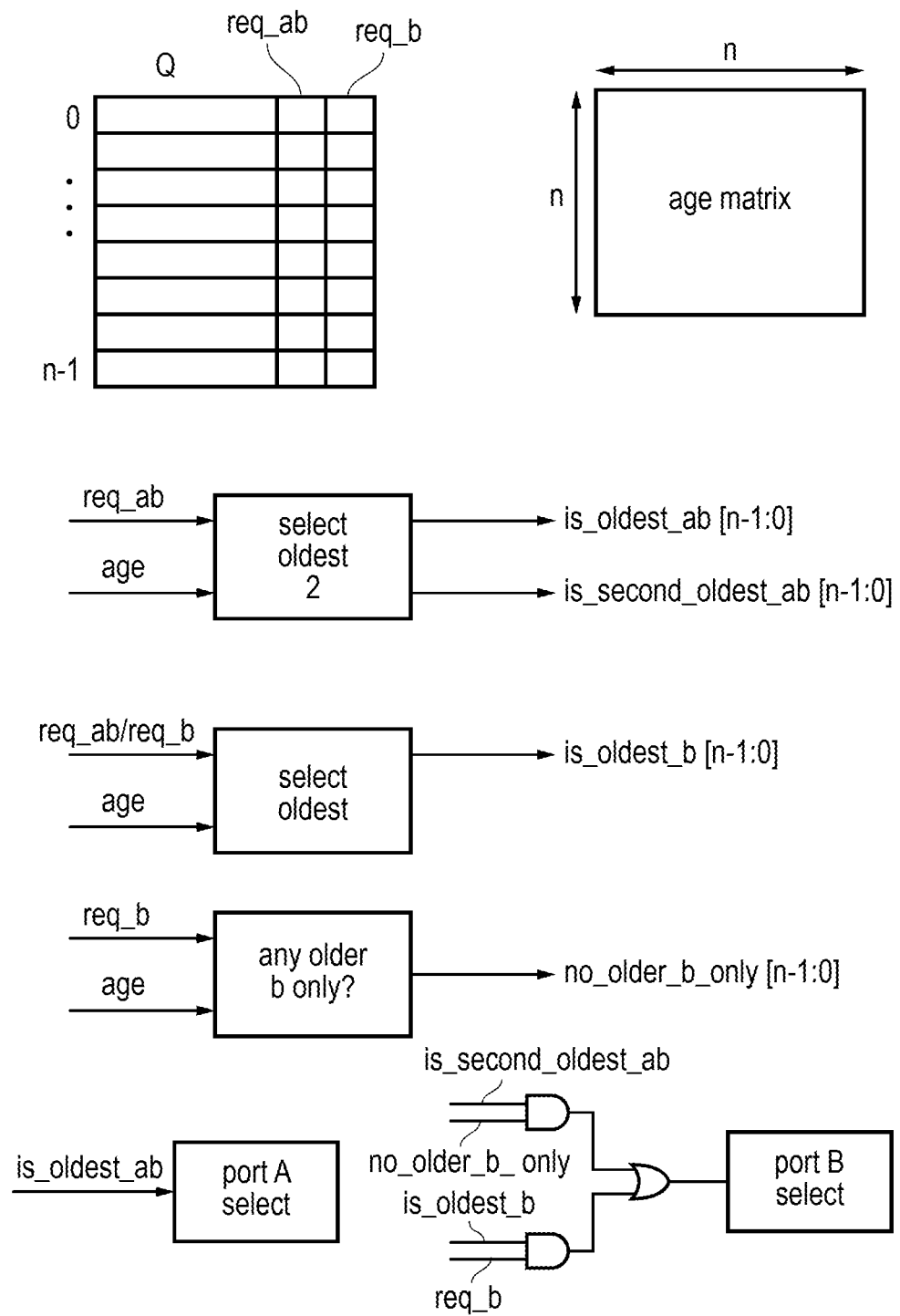
FIG. 11 shows an example of selection circuitry for selecting which instructions to issue with the respective issue ports.

Given M requesters, the issue stage may generate the following signals:
  req_ab[M−1:0]—a vector indicating for each instruction if it is ready for issue on either port A or B
  req_b[M−1:0]—a vector indicating for each instruction if it is ready for issue on port B only
  age[M−1:0][M−1:0]—an age matrix as described above
As shown in FIG. 11, using req_ab and age, the oldest two instructions requesting either port A or port B are selected (using one of the mechanisms described above, or some other mechanism). Additionally, two further age selections are made—using (req_ab|req_b) the oldest instruction which can issue to port B is identified, and also for each instruction it is determined if any older port B only instructions exist using req_b. This gives the following signals:
  is_oldest_ab[M−1:0] and is_second_oldest_ab[M−1:0]—the instructions picked as the oldest two using req_ab;
  is_oldest_b[M−1:0]—the oldest instruction requesting using (req_ab|req_b);
  no_older_b_only[n−1:0]—an indication for each instruction of whether there are any older B-only instructions requesting using req_b The is_oldest_ab signal is then used as the selection for arbitration for port A, while port B selects using the expression "(is_second_oldest_ab & no_older_b_only)|(is_oldest_b & req_b)" (where & indicates AND and | indicates OR).

Figure 12:
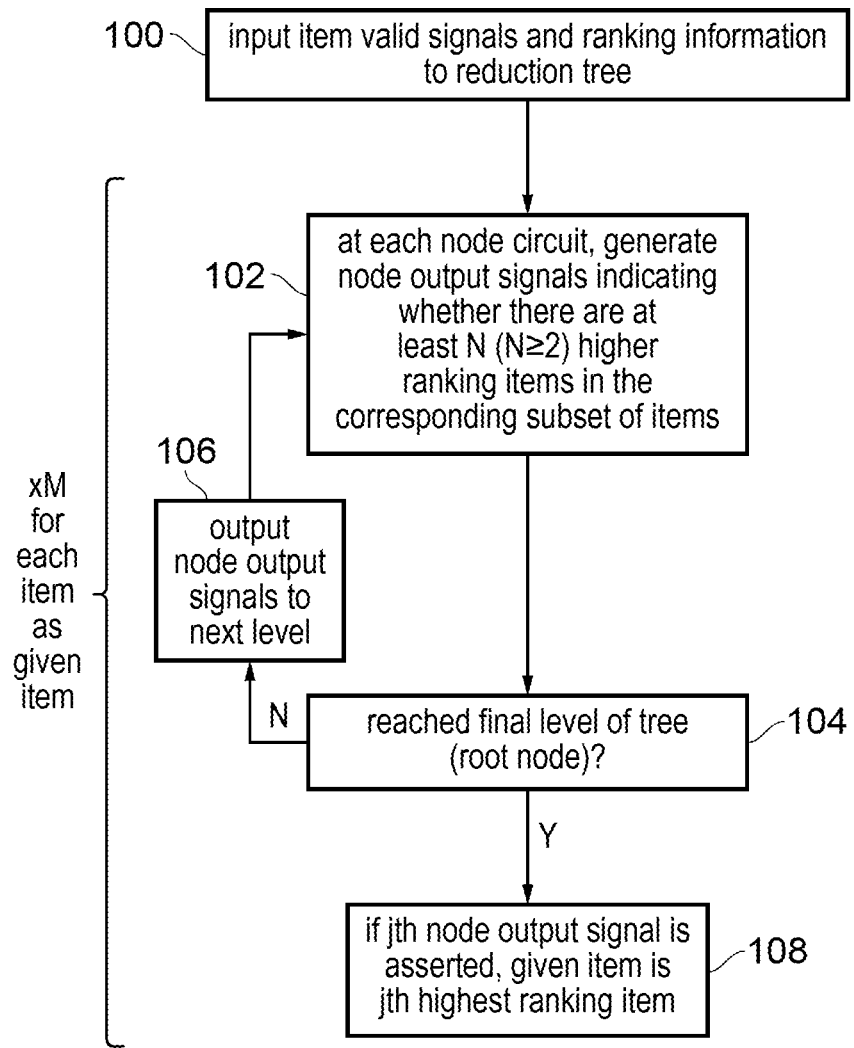
FIG. 12 is a flow diagram illustrating a method of selecting N items, ordered by their ranking, from a set of M items, where $2 \leq N \leq M$.

FIG. 12 is a flow diagram illustrating a method of ranking items by ranking information. At step 100, item valid signals indicating the validity of a set of M items, and ranking information indicating relative rankings between respective pairs of items, are input to the first level of the reduction tree. At step 102, at each node circuit of the current level of the reduction tree, the node circuit generates node output signals indicating, for each value of k where 1≤k≤N and N≥2, whether a corresponding subset of the set of M items includes at least k higher ranking items than the given item. At step 104, if the final level of the tree has not yet been reached, the method continues to step 106 where the node output signals from each node circuit are output to the next level of the tree, and the method returns to step 102. Once the final level of the tree has been reached, the signals from the root node circuit 50-R at the final level are output and used to evaluate information about the ranked items. At step 108, if the $j^{th}$ node output signal is asserted, this indicates that the given item is the $j^{th}$ highest ranking item. The steps shown in FIG. 12 are performed M times, each time with a different item as the given item (typically the M iterations are performed in parallel using M corresponding reduction trees), with the outputs of each reduction tree controlling arbitration between the items.

In the examples shown in the drawings, the selection is based on ranking information which expresses an order of preference such that a higher ranked item is considered more preferred than a lower ranked item. However, in other examples a lower ranked item could be considered more preferred (in the order of preference defined by the ranking information) than a higher ranked item (e.g. if the aim is to select the youngest items or the lowest priority items). Hence, more generally the reduction tree described above may generate node output signals indicating, for each value of k from 1 to N (where N is 2 or greater), whether there are at least k more preferred items than the given item in the order of preference defined by the ranking information.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus comprising:
    a reduction tree to rank a given item of a set of M items relative to other items of the set of M items, in dependence on ranking information indicative of an order of preference for the set of M items, the reduction tree comprising a plurality of levels of node circuits arranged in a tree structure, each node circuit configured to generate a set of node output signals indicating, for each value of k where 1≤k≤N and N≥2, whether a corresponding subset of the set of M items includes at least k more preferred items than the given item;
    wherein a node circuit at a level of the reduction tree other than a first level is configured to combine the set of node output signals generated by at least two node circuits at a previous level of the reduction tree, such that the number of items in the corresponding subset increases through successive levels of the reduction tree, until the subset of items corresponding to a root node circuit at a final level of the reduction tree comprises the set of M items.

2. The apparatus according to claim 1, wherein the apparatus comprises selection circuitry to determine whether to select the given item as one of N most preferred items of the set of M items in dependence on said set of node output signals generated by said root node circuit.

3. The apparatus according to claim 1, comprising selection circuitry to determine whether to select the given item according to a relative ranking of the given item among the set of M items determined in dependence on said set of node output signals generated by said root node circuit.

4. The apparatus according to claim 1, wherein said set of node output signals comprises at least N node output signals, where $2 \leq N \leq M$ and the $i^{th}$ node output signal is indicative of whether a corresponding subset of the set of M items includes at least i more preferred items than the given item, where $1 \leq i \leq N$.

5. The apparatus according to claim 1, comprising a plurality of said reduction trees, each reduction tree having the given item corresponding to a different item of said set of M items.

6. The apparatus according to claim 1, wherein the ranking information comprises a plurality of ranking values, each ranking value corresponding to a pair of items of the set of M items and indicative of which of the pair of items is most preferred.

7. The apparatus according to claim 6, wherein a node circuit in the first level of the reduction tree is configured to receive, for each item of said subset of items other than the given item, the ranking value indicative of whether that item is more or less preferred than the given item, and to generate the set of node output signals in dependence on the ranking values received for each of the subset of items other than the given item.

8. The apparatus according to claim 1, wherein each item is associated with a valid signal indicative of whether the corresponding item is valid, and the reduction tree is configured to rank the given item relative to valid items from the set of M items.

9. The apparatus according to claim 1, wherein N=2.

10. The apparatus according to claim 1, wherein N=3.

11. The apparatus according to claim 1, wherein the ranking information ranks the set of M items according to one of:
item age; and
item priority.

12. The apparatus according to claim 1, wherein said more preferred items comprise higher ranking items.

13. The apparatus according to claim 1, wherein said more preferred items comprise lower ranking items.

14. The apparatus according to claim 1, wherein the items comprise instructions; and
the apparatus comprises issue circuitry comprising at least two issue ports each to issue instructions for execution by at least one execution unit,
wherein the issue circuitry is configured to select which instructions are to be issued using a given issue port in dependence on N most preferred instructions selected by selection circuitry comprising the reduction tree.

15. The apparatus according to claim 14, wherein the issue ports comprise a first issue port, and a second issue port capable of issuing at least one type of instruction which is unsupported by the first issue port.

16. The apparatus according to claim 15, wherein the issue circuitry is configured to select the N most preferred instructions from a set of M instructions capable of being issued by both the first issue port and the second issue port, said set of M instructions comprising a subset of a set of P instructions capable of being issued by the second issue port, where $M \leq P$ and $N<M$.

17. The apparatus according to claim 16, wherein when the most preferred instruction of said set of P instructions is incapable of being issued by the first issue port, the issue circuitry is configured to issue said most preferred instruction of said set of P instructions using the second issue port and issue the most preferred instruction of said set of M instructions using the first issue port.

18. The apparatus according to claim 16, wherein when the most preferred instruction of said set of P instructions is capable of being issued by the first issue port, the issue circuitry is configured to issue the most preferred instruction of said set of M instructions using the first issue port and to issue the second most preferred instruction of said set of M instructions using the second issue port.

19. A method comprising:
ranking a given item of a set of M items relative to other items of the set of M items, in dependence on ranking information indicative of an order of preference for the set of M items;
the ranking comprising processing the ranking information using a reduction tree comprising a plurality of levels of node circuits arranged in a tree structure, each node circuit generating a set of node output signals indicating, for each value of k where $1 \leq k \leq N$ and $N \geq 2$, whether a corresponding subset of the set of M items includes at least k more preferred items than the given item;
wherein a node circuit at a level of the reduction tree other than a first level combines the set of node output signals generated by at least two node circuits at a previous level of the reduction tree, such that the number of items in the corresponding subset increases through successive levels of the reduction tree, until the subset of items corresponding to a root node circuit at a final level of the reduction tree comprises the set of M items.

20. An apparatus comprising:
first and second issue ports to issue instructions for execution by at least one execution unit, wherein the second issue port is capable of issuing at least one type of instruction which is unsupported by the first issue port; and
selection circuitry to select, from among a set of pending instructions, instructions to be issued using the first issue port and the second issue port;
wherein the selection circuitry is configured to perform, in dependence on ranking information indicative of an order of preference for the set of pending instructions:
a first selection operation to select two most preferred instructions from a subset of the set of pending instructions capable of being issued by both the first issue port and the second issue port; and
a second selection operation to select a most preferred instruction from the set of pending instructions capable of being issued using the second issue port; and
the selection circuitry is configured to select said instructions to be issued using the first issue port and the second issue port in dependence on the first selection operation and the second selection operation.

* * * * *